United States Patent [19]

Spitzer

[11] Patent Number: 4,875,370
[45] Date of Patent: Oct. 24, 1989

[54] APPARATUS FOR MEASURING THE CONTENTS OF A TANK

[75] Inventor: Martin Spitzer, Weikendorf, Austria

[73] Assignee: Witronic Elektronische Gerate Gesellschaft M.B.H., Vienna, Austria

[21] Appl. No.: 307,652

[22] Filed: Feb. 7, 1989

[30] Foreign Application Priority Data

Feb. 8, 1988 [AT] Austria .................................. 256/88

[51] Int. Cl.⁴ ...................... G01F 23/62; G01F 23/30
[52] U.S. Cl. ...................................... 73/309; 361/178;
307/118; 73/313; 73/314; 73/319; 73/322.5;
73/DIG. 5; 73/149
[58] Field of Search ................. 73/309, 313, 314, 319,
73/322.5, 149, DIG. 5; 340/623, 624; 364/509;
324/207, 208; 361/178; 307/118

[56] References Cited

U.S. PATENT DOCUMENTS

| 2,552,552 | 5/1951 | Head | 73/322.5 |
| 2,911,828 | 11/1959 | Keating et al. | 73/309 |
| 3,611,285 | 10/1971 | Eggstein | 340/624 |
| 4,475,290 | 10/1984 | Colditz | 73/314 |
| 4,497,205 | 2/1985 | Zulauf et al. | 73/319 |
| 4,639,665 | 1/1987 | Gary | 324/207 |
| 4,771,804 | 9/1988 | Morales | 73/313 |

FOREIGN PATENT DOCUMENTS

| 820993 | 11/1937 | France | 73/313 |
| 56-79912 | 6/1981 | Japan | 73/313 |

Primary Examiner—William A. Cuchlinski, Jr.
Assistant Examiner—Diego F. F. Gutierrez
Attorney, Agent, or Firm—Herbert Dubno

[57] ABSTRACT

The liquid level in a tank is determined by measuring the current supplied to an elctromagnet from which a rod having a specific gravity greater than that of the liquid is suspended in the liquid.

9 Claims, 2 Drawing Sheets

APPARATUS FOR MEASURING THE CONTENTS OF A TANK

FIELD OF THE INVENTION

My present invention relates to an apparatus for measuring the amount of a liquid in a tank and, more particularly, to an apparatus for measuring the level of liquid in a tank and from which the volume of the liquid can be determined. The invention also relates to a method of measuring the liquid level and volume in a tank.

BACKGROUND OF THE INVENTION

In prior techniques for measuring the liquid level in a large tank, generally a measuring rod was lowered into the tank by an attendant, especially in the case of subterranean tanks at fuel depots and the like, or some float-type of system was used to detect the position of a float line on the liquid surface. For very large tanks, the attendant was required to clamber down through the opening, such as a manhole, to measure the liquid level in some mechanical manner.

OBJECTS OF THE INVENTION

It is the principal object of the present invention to provide an improved method of and apparatus for electrically determining the volume of the contents of a tank, allowing for remote signalling of the measurement result, whereby drawbacks of earlier measuring systems can be avoided.

Another object of this invention is to provide an apparatus of simple and reliable design, which is not sensitive to attack by corrosive environments or by vapors or liquid within the tank, especially a large subterranean tank, and which can be used to indicate the liquid level and hence the contents of the tank in a simple, reliable, and accurate manner.

SUMMARY OF THE INVENTION

These objects are attained, in accordance with the present invention, in an apparatus which comprises:

an upright rod extending into the liquid in the tank whereby a buoyancy force applied by the liquid to the rod varies as a level of the liquid in the tank varies;

an electromagnet juxtaposed with a magnetically attractable portion of the rod and electrically energizable to support the rod magnetically in the tank;

an electrical control circuit connected with the electromagnet for supplying electrical current to the electromagnet;

a position sensor responsive to position of the rod in the tank and controlling the circuit whereby the electrical current supplied by the circuit to the electromagnet is varied to maintain a predetermined position of the rod as the level of the liquid in the tank varies; and indicator means coupled to the circuit and responsive to the magnitude of the electrical current supplied to the electromagnet for indicating the level and hence the quantity of liquid in the tank.

More specifically, the tank has an entry opening at an upper portion of the tank and the electromagnet and position sensor are located at the entry opening.

The method of the invention can comprise the steps of:

(a) disposing an upright rod in the tank so as to extend into the liquid therein whereby a buoyancy force applied by the liquid to the rod varies as a level of the liquid in the tank varies;

(b) energizing an electromagnet juxtaposed with a magnetically attractable portion of the rod with an electric current to support the rod magnetically in the tank;

(c) controlling the electrical current to maintain a predetermined position of the rod in the tank whereby the electrical current supplied to the electromagnet is varied as the level of the liquid in the tank varies; and (d) measuring the magnitude of the electrical current supplied to the electromagnet for indicating the level and hence the quantity of liquid in the tank.

Specifically, therefore, at an inlet opening to the tank, at an upper portion thereof, an electromagnet can be provided to generate a magnetic field in which a rod, is held, the rod extending through the surface of the liquid in the tank and reaching substantially close to the bottom of the latter.

Since the specific gravity of the rod is greater than that of the liquid, the liquid exerts a buoyancy force on the rod which is a function of the depth of immersion of the rod in the liquid and, as this buoyancy force decreases, the magnetic-field strength required to maintain the rod in a predetermined position must be increased and the electric current supplied to the coil or electromagnet must be increased accordingly. Conversely, should the liquid level rise, the buoyancy force will increase and less magnetic force will be required to maintain the rod in its predetermined position so that the current through the electromagnet must be reduced if the rod is to remain in its position.

According to the invention, therefore, a position sensor is juxtaposed with the rod to monitor the position thereof and is electrically connected to the control circuit feeding the electromagnet with current so that the current through the electromagnet is automatically controlled to maintain the rod in its predetermined position.

The indicator responsive to the current supplied to the electromagnet can be provided to signal the magnitude of this current and thus the level of liquid in the tank. From the magnitude of the current, therefore, as determined by the current-measuring device, I can determine the volume of the liquid and thus the contents of the tank.

The electromagnet is thus traversed by a current which tends to lift the rod and to hold it in a dynamic equilibrium. The effective value of the electric power or energy required to hold the rod in the dynamic equilibrium corresponds to the apparent weight of the rod and thus the difference between the actual weight and the buoyancy force.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
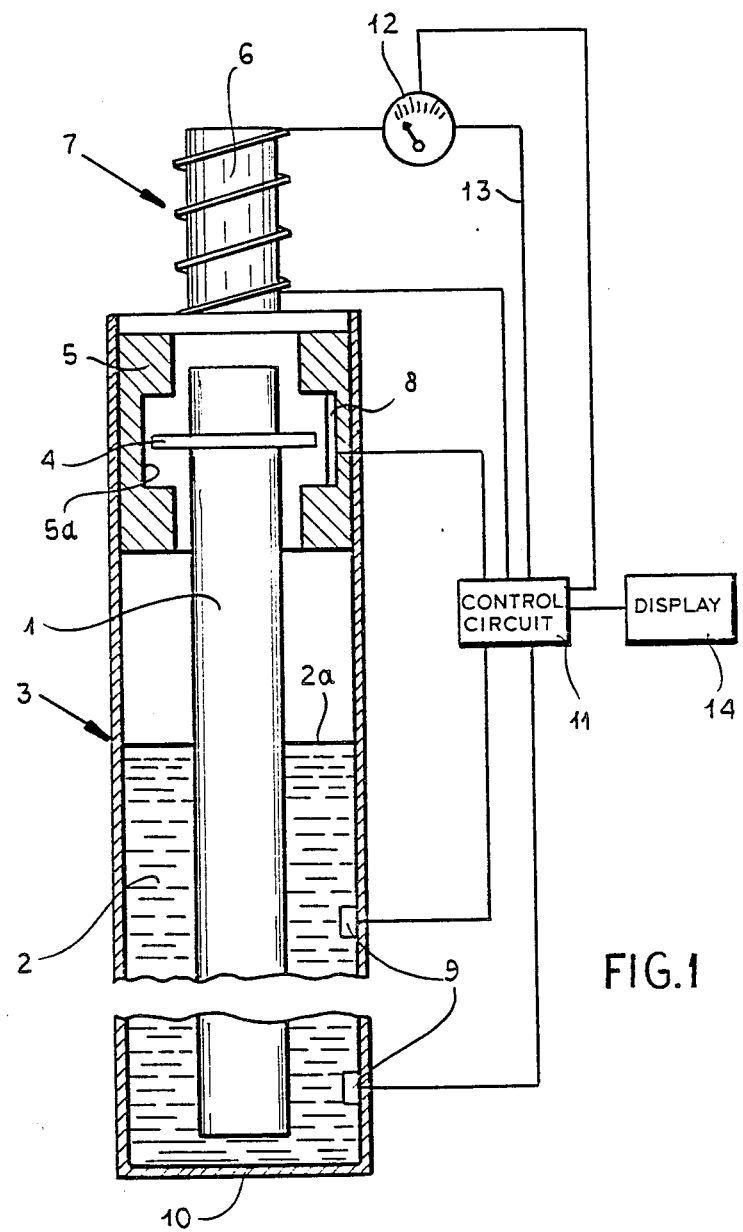
FIG. 1 is a dynamic vertical elevational view of an apparatus for measuring the level of liquid in a tank.

FIG. 1 of the drawing shows a vertical tank 3 partly filled with a liquid 2 having a liquid level 2a through which a rod 1 extends.

The vertical rod 1 reaches close to the bottom 10 of the tank 3.

The invention, of course, is also applicable to a horizontal tank since the liquid level in both vertical and horizontal tanks will be horizontal and a vertical rod can extend therein. In the embodiment of FIG. 1, the apparatus, including the rod, can be positioned at an opening of the tank while it is also possible to provide the apparatus entirely within the tank if desired.

The liquid 2 in the tank 3 has a smaller specific gravity than the rod 1 and thus the apparent weight of the rod 1 varies with the depth of immersion of the rod in the liquid.

At its upper end, the rod 1 is provided with a holder 4, e.g. a collar, which can be received in a recess 5a in a support structure 5. Within this recess, the collar is capable of vertical movement through a certain range, say a length of 5 mm.

Within the recess 5a, there is provided a position sensor 8 which measures the position of the rod 1 within its possible vertical strike and generates an electric signal representing this position which is delivered to the electrical control circuit 11.

Figure 2:
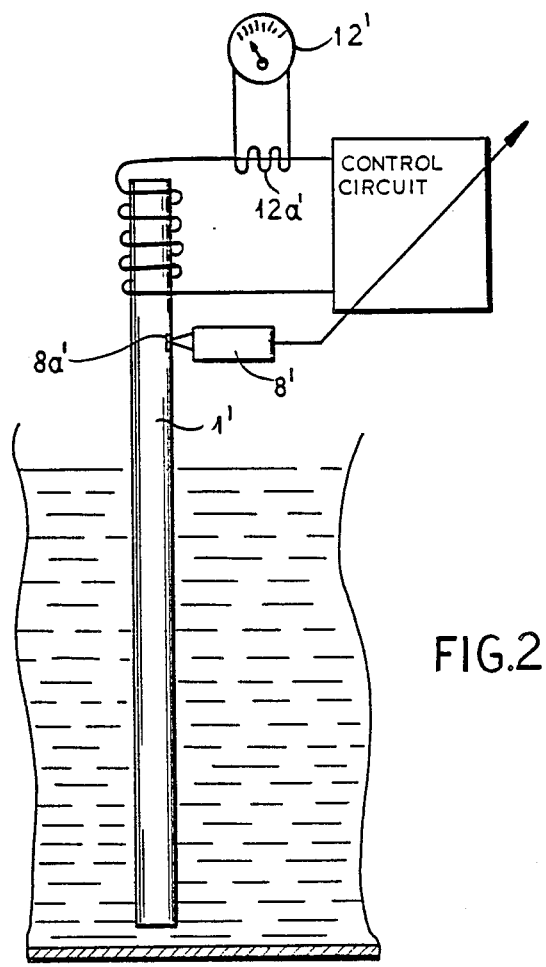
FIG. 2 is another diagram illustrating the principles of the invention.

Above the rod 1 in the inlet opening to the tank 3, an electromagnet 7 is provided with a core 6 which can either form an end to the rod as shown at 6' for the rod 1' in FIG. 2 or can be juxtaposed with a magnetically attractable end of the rod 1, as shown in FIG. 1.

When an electric current is supplied to the electromagnet 7, it generates a magnetic field which suffices to suspend the rod 1. A predetermined dynamic position of the rod is established by the position sensor 8 which supplies a signal to the controller 11 to regulate this current so that, whatever the level of liquid in the tank, the rod will be dynamically positioned at this predetermined location.

Since the current is adjusted, therefore, to match the buoyancy force on the rod and hence the liquid level, the magnitude of the current supplied to the electromagnet represents an exact measure of the level of liquid in the tank.

Thus current can be measured by a current measuring device 12 in current supply line 13 and the signal from the current-measuring unit 12 can be fed back to the control circuit if desired and to a remote location for further evaluation and display as the quantity of liquid in the tank. The display and electronic processing can be effected at 14.

It is advantageous to provide at one or more locations in the tank, level-detecting switches 9 which can be connected to the control circuit 11 as indicated in FIG. 1. Since the volume of liquid in the tank at each of these level-detecting switches is known and is constant, the signals from the switches 9 can be used to calibrate, adjust and correct the system to ensure that the level measurement signalled by the current sensor 12 will accurately reflect the actual level of the liquid and hence the volume of the liquid in the tank, in a self-correcting system.

It will be apparent that the level can be used to calculate the volume of the liquid in the tank utilizing a table or values calculated or provided in a data-processing unit since respective values of the level are associated with respective determined-volume values.

It is also possible to generate a new table for each filling process so that, for example, on filling of the tank, one can measure the number of liters filled into the tank and store this information in an electronic memory from which the number of liters in the tank can be provided to an external measuring device. The filing level is then internally calculated. For calibration, one or more fixedly-located level switches can be monitored to provided correction values.

It will be apparent that with the apparatus shown in FIG. 1, it is simple to determine the volume within a tank and to signal this information to a remote location.

In the embodiment of FIG. 2, the core 6' within the electromagnet 7' is unitary with the rod 1' which can be provided with an optical sensor 8' for the position of the rod 1' based on a marking 8a' thereon.

A current transformer 12a' connected to an indicator 12' can serve as the display of the liquid level and volume in the tank.

The position sensor can operate inductively, capacitively, optically, mechanically or in any other conventional position-detection manner.

I claim:

1. An apparatus for measuring a quantity of liquid in a tank, comprising:
   an upright rod extending into said liquid in said tank whereby a buoyancy force applied by said liquid to said rod varies as a level of said liquid in said tank varies;
   an electromagnet juxtaposed with a magnetically attractable portion of said rod and electrically energizable to support said rod magnetically in said tank;
   an electrical control circuit connected with said electromagnet for supplying electrical current to said electromagnet;
   a position sensor responsive to the position of said rod in said tank and controlling said circuit whereby the electrical current supplied by said circuit to said electromagnet is varied to maintain a predetermined position of said rod as said level of said liquid in said tank varies; and
   indicator means coupled to said circuit and responsive to the magnitude of the electrical current supplied to said electromagnet for indicating said level and hence the quantity of liquid in said tank.

2. The apparatus defined in claim 1 wherein said tank has an entry opening at an upper portion of said tank and said electromagnet and position sensor are located at said entry opening.

3. The apparatus defined in claim 2 wherein said magnetically attractable portion is a magnetic core formed as the upper portion of said rod and extending into said electromagnet.

4. The apparatus defined in claim 2 wherein said magnetically attractable portion is an upper end of said rod juxtaposed with a magnetic core surrounded by said electromagnet.

5. The apparatus defined in claim 2, further comprising a support carrying said electromagnet and surrounding an upper end of said rod, said upper end of said rod having a holder received in said support.

6. The apparatus defined in claim 5 wherein said holder is a collar;

7. The apparatus defined in claim 5 wherein said holder is received in a recess of said support, said position sensor being provided in said recess and being connected to said circuit for electronically controlling same.

8. The apparatus defined in claim 2 wherein said tank is provided with at least one level detector at a fixed location in said tank, connected electrically to said circuit and calibrating same.

9. A method of measuring a quantity of liquid in a tank, comprising the steps of:
(a) disposing an upright rod in said tank so as to extend into the liquid therein whereby a buoyancy force applied by said liquid to said rod varies as a level of said liquid in said tank varies;
(b) energizing an electromagnet juxtaposed with a magnetically attractable portion of said rod with an electric current to support said rod magnetically in said tank;
(c) controlling said electrical current to maintain a predetermined position of said rod in said tank whereby the electrical current supplied to said electromagnet is varied as said level of said liquid in said tank varies; and
(d) measuring the magnitude of the electrical current supplied to said electromagnet for indicating said level and hence the quantity of liquid in said tank.

* * * * *